(12) United States Patent
Choi et al.

(10) Patent No.: US 8,737,605 B2
(45) Date of Patent: May 27, 2014

(54) PRIVACY REGION MASKING DEVICE AND METHOD IN VEHICLE BLACK BOX

(75) Inventors: SuGil Choi, Daejeon (KR); Jong-Wook Han, Daejeon (KR); Min-ho Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 112 days.

(21) Appl. No.: 13/297,780

(22) Filed: Nov. 16, 2011

(65) Prior Publication Data

US 2012/0121082 A1 May 17, 2012

(30) Foreign Application Priority Data

Nov. 17, 2010 (KR) .......................... 10-2010-0114473
Apr. 4, 2011 (KR) .......................... 10-2011-0030754

(51) Int. Cl.
*H04L 9/00* (2006.01)
(52) U.S. Cl.
USPC ................................. 380/28; 380/26; 287/210
(58) Field of Classification Search
USPC ............................................. 380/26; 287/210
See application file for complete search history.

(56) References Cited

U.S. PATENT DOCUMENTS

| 6,211,907 | B1* | 4/2001 | Scaman et al. ................. 348/148 |
| 7,508,415 | B2 | 3/2009 | Seo |
| 8,423,235 | B2* | 4/2013 | Lee ................................. 701/31 |
| 2007/0115356 | A1 | 5/2007 | Kang et al. |
| 2010/0328460 | A1* | 12/2010 | Merkel et al. ................. 348/143 |
| 2011/0150327 | A1* | 6/2011 | Yoo et al. ....................... 382/165 |

FOREIGN PATENT DOCUMENTS

| KR | 10-2005-0048781 | 5/2005 |
| KR | 10-2007-0048841 | 5/2007 |

* cited by examiner

*Primary Examiner* — Ghazal Shehni
(74) *Attorney, Agent, or Firm* — Staas & Halsey LLP

(57) ABSTRACT

A privacy region-masking device of an automobile black box system includes a masking region configuration module for constructing a masking region on an internal image of a vehicle and a key management module for creating and managing a masking key which is used for masking the masking region on the internal image of the vehicle. The privacy region-masking device further includes a masking execution module for masking the masking region on the image using the masking key, thereby generating a masked image adaptable to protect the privacy of a passenger.

16 Claims, 2 Drawing Sheets

PRIVACY REGION MASKING DEVICE AND METHOD IN VEHICLE BLACK BOX

CROSS-REFERENCE TO RELATED APPLICATION(S)

The present invention claims priority of Korean Patent Application Nos. 10-2010-0114473 and 10-2011-0030754, filed on Nov. 17, 2010 and Apr. 4, 2011, which are incorporated herein by reference.

FIELD OF THE INVENTION

The present invention relates to a vehicle black box, and more particularly, to a privacy region-masking device and method to protect privacy by masking a region of the image which is filmed by a vehicle black box.

BACKGROUND OF THE INVENTION

Most of existing vehicle black boxes is recording the surroundings of a vehicle by using a built-in camera. The vehicle black boxes are recently being developed to additionally record the driving history and the audio from an accident site. The driving history recorded in the vehicle black box may include a running speed of the vehicle, a rotation angle of the steering wheel, and so on.

Up to the present, such vehicle black boxes are mainly used to record images of the vehicle's surroundings for detecting an accident occurrence or a traffic violation of the driver. Recently, the vehicle black boxes are also being used for recording the indoor circumstances of a vehicle. The use of vehicle black boxes recording the indoor circumstances of the vehicle is increasing. Therefore, it is necessary to protect the privacy of the passenger captured in the images.

In order to protect the privacy of the passenger captured in the images, a technique partially masking the image and storing the masked image is widely being used. The privacy region-masking technique of the related art had been made mainly for a CCTV (Closed Circuit Television) camera. In other words, the privacy region-masking technique of the related art has not been developed for the vehicle black box. As such, the privacy region-masking technique of the related art cannot effectively detect a region to be masked and cannot protect the privacy from illegal use of the image.

SUMMARY OF THE INVENTION

In view of the above, the present invention provides a privacy region-masking device and method of a vehicle black box to protect the privacy of a passenger by dynamically or statically detecting regions to be masked in an image, masking the detected regions of the image, and storing the masked image.

In accordance with an aspect of the present invention, there is provided a privacy region-masking device for use in a vehicle black box, which includes:

a masking region configuration module for constructing a masking region on an internal image of a vehicle;

a key management module for creating and managing a masking key which is used for masking the masking region on the internal image of the vehicle; and a masking execution module for masking the masking region on the image using the masking key, to generate a masked image.

Preferably, the masking region configuration module constructs a part of the image as the masking region, which is predefined under consideration of an inner space of the vehicle or a passenger within the vehicle.

Preferably, the masking region configuration module constructs the masking region using an image recognition algorithm.

Preferably, the masking region includes at least one of the face or entire body of a passenger within the vehicle.

Preferably, the key management module manages either a self-created masking key or an externally provided masking key.

Preferably, the masking key is created when the vehicle black box is manufactured.

Preferably, the privacy region-masking device further includes an external interface to which an external device is connectable, wherein the masking key created by the key management module is stored in the external device after being encrypted using a master key which is different from the masking key.

Preferably, the masking execution module generates the masked image through processes such as replacing the masking region with an arbitrary color or image, or encrypting the masking region using the masking key.

Preferably, the masking execution module encrypts either pixel values within the masking region or an encoded data of the masking region.

Preferably, the masking execution module selectively encrypts either all the encoded data or a pre-designated part of the encoded data.

Preferably, the masking execution module stores each positions of the masking regions separately.

In accordance with another aspect of the present invention, there is provided a privacy region-masking method of an vehicle black box, which includes:

obtaining an internal image of a vehicle which is filmed by a camera;

constructing a masking region on the inner image of the vehicle; and performing a masking process on the masking image to generate a masked image.

Preferably, said constructing a masking region includes constructing the pre-designated region as the masking region.

Preferably, said constructing a masking region includes constructing the masking region using an image recognition algorithm.

Preferably, said constructing a masking region includes constructing the face or the entire body of a passenger as a masking region by recognizing at least one of an inner structure of the vehicle and the passenger using the image recognition algorithm.

Preferably, said performing a masking process on the masking image includes replacing the masking region with an arbitrary color or image to generate the masked image.

Preferably, the method further includes creating a masking key for the masking process, wherein said performing a masking process on the masking image includes encrypting the masking region using the masking key to generate the masked image.

Preferably, said performing a masking process on the masking image includes encrypting either pixel values within the masking region or an encoded data of the masking region to generate the masked image.

Preferably, said performing a masking process on the masking image includes selectively encrypting either all the encoded data or a pre-designated part of the encoded data to generate the masked image.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
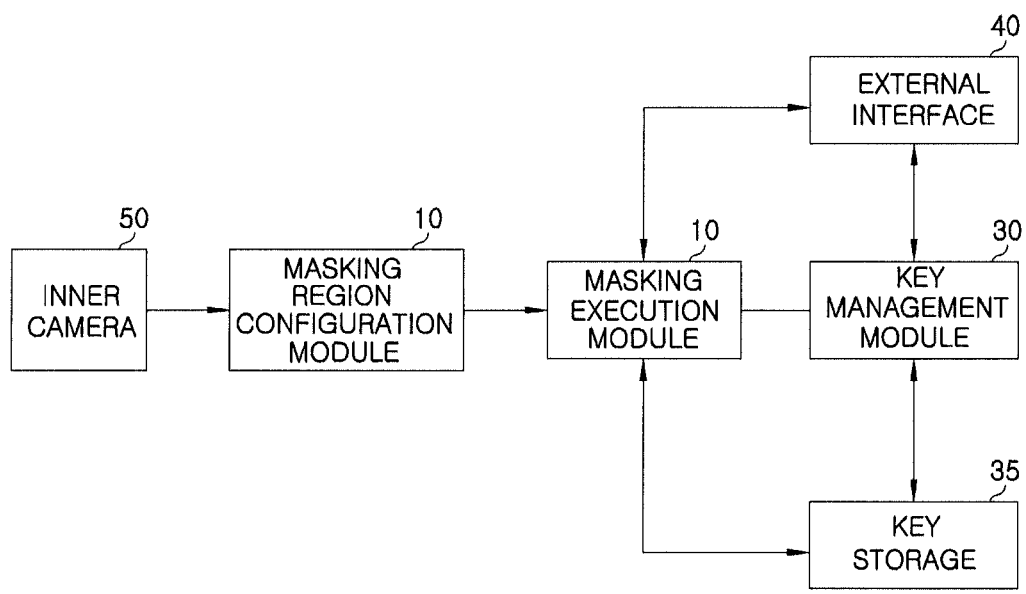
FIG. 1 is a block diagram showing a privacy region-masking device of the vehicle black box in accordance with an embodiment of the present invention.

FIG. 1 is a block diagram showing a privacy region-masking device of the vehicle black box in accordance with an embodiment of the present invention. The privacy region-masking device includes a masking region configuration module 10, a masking execution module 20, a key management module 30 and an external interface 40, which may be either embodied integrally with a vehicle black box or separately from a vehicle black box.

The masking region configuration module 10 constructs the masking region in an internal image of a vehicle, provided from an inner camera 50 arranged to take a photograph for an inner space of the vehicle. In the present embodiment, the masking regions may be constructed in two modes, for example, in dynamic and static modes. The static mode constructs a pre-designated region as a masking region to protect privacy. On the other hand, the dynamic mode automatically detects and constructs the masking region which needs to be protected for privacy by using an image recognition algorithm. The face or the entire body of a human may be included in the masking region.

Substantially, the present embodiment allows a user to select which mode to use to construct the masking region between the static and dynamic modes. For example, the masking region configuration module 10 included in the embodiment of the present invention provides a man-machine interface (not shown). As such, the user may select the mode between the dynamic and static modes using the man-machine interface. In the dynamic mode, i.e., when the masking region is automatically detected by using the image recognition algorithm, the masking region may be constructed under consideration of the vehicle's indoor situation and the passenger in the vehicle.

The masking execution module 20 masks the region designated by the masking region configuration module 10. The masking process performed by the masking execution module 20 may proceed in the following two modes.

A first masking mode is a block replacement mode. The block replacement mode replaces the masking region within an image with an arbitrary color or image, so that the image can be protected for privacy against an illegal use. A second masking mode corresponds to an encryption mode. The encryption mode encrypts the masking region using a cipher key, hereinafter "masking key", thereby making the masked region unable to be recovered in the absence of the masking key. The encryption mode encrypts either pixel values within the masking region or encoded data of the masking region. Similarly to the constructing process of the masking region, the present embodiment allows the masking process to be performed in the block replacement mode or the encryption mode according to the selection of a user. To this end, the masking region configuration module 10 included in the embodiment of the present invention is provided with a man-machine interface (not shown) which allows the user to select the mode between the block replacement mode and the encryption mode. Therefore, the masking execution module 20 performs the masking process in the mode selected between the block replacement mode and the encryption mode.

In the encryption masking process, the masking execution module 20 may selectively encrypt either all the encoded data of the masking region or only an important portion of the encoded data.

Moreover, the masking execution module 20 may separately store information on coordinates of the masking regions separately.

The key management module 30 creates and manages the masking key which is used for masking the masking region. The masking key being managed in the masking management module 30 may be provided when the vehicle black box is manufactured. And the masking key may be stored in the key storage 35.

Alternatively, it is possible to design for the key management module 30 to create the masking key itself and store the created masking key in the key storage 35. In addition, the key management module 30 may externally receive the masking key and store the received masking key in the key storage 35.

In order to safely manage the masking key, the key management module 30 may store the masking key in a separate hardware, for example an external recording medium such as a USE (Universal Serial Bus) memory.

Alternatively, the key management module 30 may store the masking key in the separate hardware different from the key storage 35, read out the masking key from the separate recording medium, and use the read-out masking key. Therefore, the masking key may be safely managed.

Alternatively, the masking key employed in the encryption of the masking region may be primarily encrypted using a master key, so that the encrypted image is recovered by only an entity having the valid authority. The master key may then be stored in either the inside of the vehicle black box or an external device which is connected to the vehicle black box through a communication network.

Such a master key managed by the key management module 30 needs to be known only to relevant entities having the special authority. The relevant entities with the special authorities may be a government agency, a manufacturer of the vehicle black box, and others.

The key storage 35 stores the masking key under the control of the key management module 30. This key storage 35 may be either included in the vehicle black box or attached to the outside of the vehicle black box.

The external interface 40 is used for connecting this privacy region-masking device with an external recording medium, the hardware of the vehicle black box, and so on. As an example of the external interface 40, a USB interface may be employed. As such, the masking key managed by the key management module 30 may be stored in the external recording medium and/or the hardware of the vehicle black box.

In this manner, the privacy region-masking device in accordance with the embodiment of the present invention may enable the masking process to be performed for not only the passenger but also the driver. The privacy region-masking device may mask the important portions for anybody in the vehicle. Therefore, the privacy of the passenger may be protected.

Figure 2:
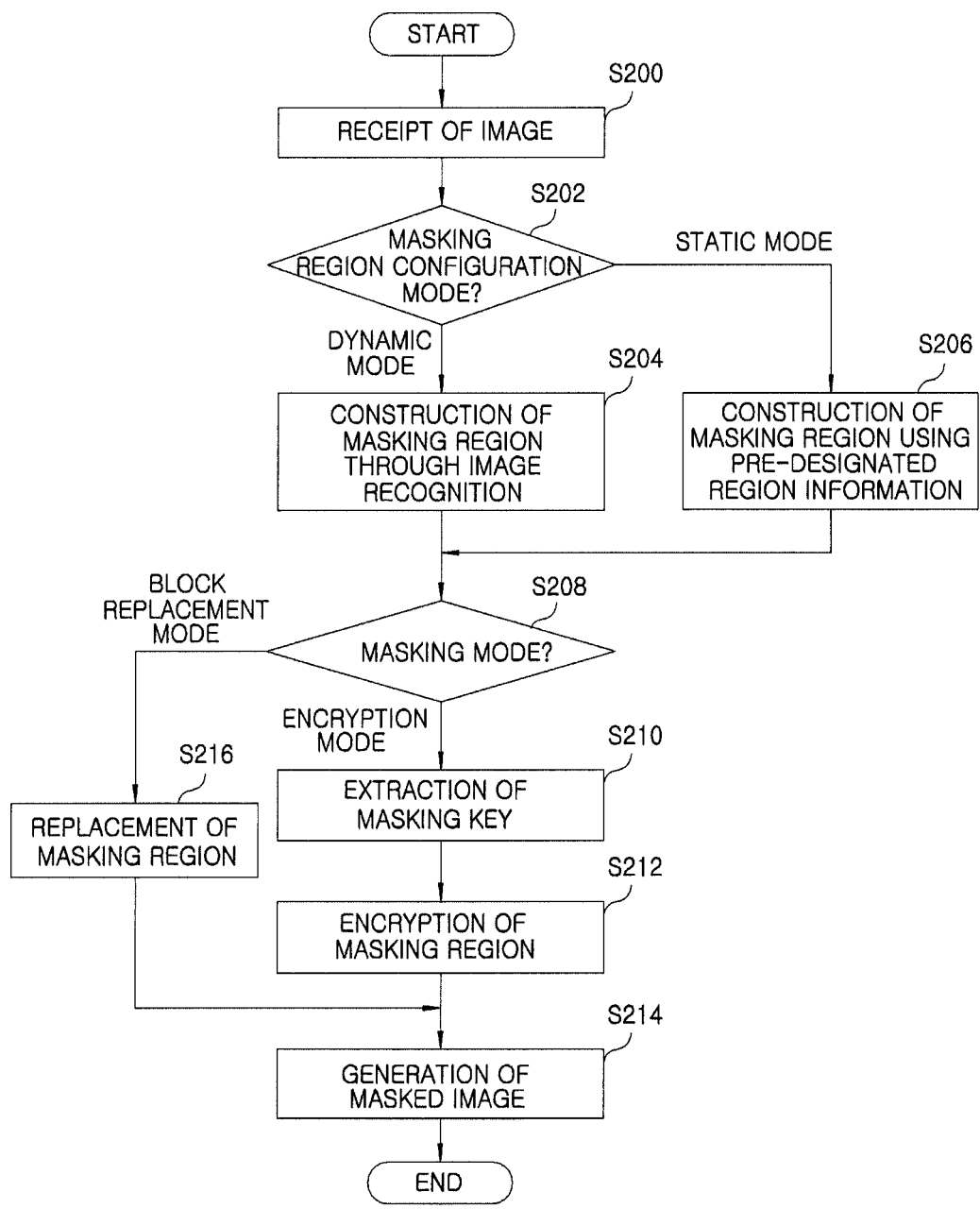
FIG. 2 is a flow chart illustrating a procedure for generating a masked image in the privacy region-masking device of FIG. 1.

FIG. 2 is a flow chart illustrating a process for generating a masked image to protect privacy in the privacy region-masking device of the vehicle black box shown in FIG. 1.

In step 200, an internal image of the vehicle filmed by an inner camera 50 is obtained as an input. In step S202, the masking region configuration module 10 determines which one of the modes is selected between dynamic and static modes for the configuration of a masking region. If the dynamic mode is selected as a configuration mode of the masking region, the masking region configuration module 10 proceeds to step 204. In step 204, the masking region configuration module 10 automatically detects a region to be protected for privacy in the image which shows the inside of a vehicle. For example, the masking region configuration module 10 detects passenger's face to protect privacy using an image recognition algorithm. Also, the masking region configuration module 10 constructs the detected region as a masking region. For example, the masking region configuration module 10 recognizes a face of the passenger in the image and constructs the recognized face as a masking region.

On the contrary, when it is determined that the static mode is a configuration mode of the masking region in the step 202, the process enters step 206. In the step 206, the masking region configuration module 10 constructs a pre-designated region as a masking region. The pre-designated region may be constructed by a user.

The masking region being constructed in steps 204 and 206 includes coordinate values. And these values are applied to the masking execution module 20.

Thereafter, the masking execution module 20 determines a masking mode when the coordinate values for the masking region are provided. More specifically, the masking execution module 20 determines which one of the modes is set as a masking mode between the block replacement mode and the encryption mode in step 208.

If it is determined that the encryption mode is set as the masking mode in step 208, the masking execution module 20 extracts a masking key which is managed by the key management module 30 in step 210. Thereafter, the masking execution module 20 encrypts the masking region of the image using the extracted masking key in step 212, and generates a masked image in step 214. In other words, the masking execution module 20 reads-out the masking key from the key storage 35, and then encrypts either pixel values within the masking region or encoded data of the masking region using the read-out masking key.

However, when the block replacement mode is determined as a masking mode in step 208, the process advances to step 216. In step 216, the masking execution module 20 generates a masked image by replacing the masking region with an arbitrary color or image.

Such a masked image is stored in a designated recording medium. For example, the masked image may be stored in either any one of a hard-disk driver and a memory device which are provided within the vehicle black box, or an external recording medium which is connected to the external interface 40.

When the masked image is stored, coordinates of the masking regions may be stored separately.

In this way, the privacy region-masking method in accordance with the embodiment of the present invention may enable the masking process to be performed for not only the passenger but also the driver. The privacy region-masking method may mask important portions of anybody in the vehicle. Also, the privacy region-masking method stores the masked image in the recording medium. Therefore, the privacy of the passenger can be protected.

As described above, the privacy region-masking device and method in accordance with the embodiment of the present invention masks the regions related with the passenger's privacy, so that passenger's privacy can be protected even if the image recorded in the vehicle black box is leaked out or illegally used.

While the invention has been shown and described with respect to the preferred embodiments, it will be understood by those skilled in the art that various changes and modifications may be made without departing from the scope of the invention as defined in the following claims.

What is claimed is:

1. A vehicle privacy region-masking device comprising:
a computer, comprising
a vehicle black box visually recording an interior of a vehicle, the vehicle black box comprising:
a masking region configuration logic module for automatically constructing a masking region of an internal image of a vehicle;
a key management logic module for creating and managing a masking key which is used for masking the masking region on the internal image of the vehicle; and
a masking execution logic module for masking the masking region on the internal image using the masking key, to generate a masked image, and
wherein the masking region configuration logic module constructs a part of the internal image as the masking region, which is predefined under consideration of an inner space of the vehicle or a passenger within the vehicle.

2. The privacy region-masking device of claim 1, wherein the masking region configuration logic module constructs the masking region using an image recognition algorithm.

3. The privacy region-masking device of claim 1, wherein the masking region includes at least one of the face or entire body of a passenger within the vehicle.

4. The privacy region-masking device of claim 1, wherein the key management logic module manages either a self-created masking key or an externally provided masking key.

5. The privacy region-masking device of claim 1, wherein the masking key is created when the vehicle black box is manufactured.

6. The privacy region-masking device of claim 1, further comprising an external interface to which an external device is connectable, wherein the masking key created by the key management logic module is stored in the external device after being encrypted using a second master key which is different from the masking key.

7. The privacy region-masking device of claim 1, wherein the masking execution logic module generates the masked image through processes such as replacing the masking region with an arbitrary color or image, or encrypting the masking region using the masking key.

8. The privacy region-masking device of claim 7, wherein the masking execution logic module encrypts either pixel values within the masking region or an encoded data of the masking region.

9. The privacy region-masking device of claim 8, wherein the masking execution logic module selectively encrypts either all the encoded data of the masking region or a pre-designated part of the encoded data of the masking region.

10. The privacy region-masking device of claim 1, wherein the masking execution logic module stores coordinates of the masking regions separately.

11. A privacy region-masking method for use with an vehicle black box, the method comprising:
- obtaining an internal image of a vehicle which is filmed by a camera of the black box;
- constructing, automatically, a masking region on the inner image of the vehicle; and
- performing a masking process on the masking image to generate a masked image,
- wherein the constructing a masking region includes using an image recognition algorithm, and
- wherein the constructing a masking region includes constructing the face or the entire body of a passenger as a masking region by recognizing at least one of an inner structure of the vehicle and the passenger using the image recognition algorithm.

12. The method of claim 11, wherein the constructing a masking region further includes constructing the pre-designated region as the masking region.

13. The method of claim 11, wherein said performing a masking process on the masking image includes replacing the masking region with an arbitrary color or image to generate the masked image.

14. The method of claim 11, further comprising:
- creating a masking key for the masking process, wherein said performing a masking process on the masking image includes encrypting the masking region using the masking key to generate the masked image.

15. The method of claim 14, wherein said performing a masking process on the masking image includes encrypting either pixel values within the masking region or an encoded data of the masking region to generate the masked image.

16. The method of claim 15, wherein said performing a masking process on the masking image includes selectively encrypting either all the encoded data or a pre-designated part of the encoded data to generate the masked image.

\* \* \* \* \*